United States Patent
Cho (10) Patent No.: US 9,189,358 B2
(45) Date of Patent: Nov. 17, 2015

(54) APPARATUS AND METHOD FOR VERIFYING OPERATING SYSTEM OF HOST DEVICE IN PORTABLE TERMINAL

(71) Applicant: Samsung Electronics Co., Ltd., Gyeonggi-do (KR)

(72) Inventor: Soon-Yong Cho, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 42 days.

(21) Appl. No.: 13/771,876

(22) Filed: Feb. 20, 2013

(65) Prior Publication Data

US 2013/0227177 A1    Aug. 29, 2013

(30) Foreign Application Priority Data

Feb. 24, 2012  (KR) .................... 10-2012-0018999

(51) Int. Cl.
| | | |
|---|---|---|
| G06F 3/00 | (2006.01) | |
| G06F 13/12 | (2006.01) | |
| G06F 13/00 | (2006.01) | |
| G06F 13/42 | (2006.01) | |
| G06F 11/30 | (2006.01) | |
| G06F 9/44 | (2006.01) | |

(52) U.S. Cl.
CPC .......... *G06F 11/3051* (2013.01); *G06F 9/4413* (2013.01)

(58) Field of Classification Search
CPC ....... G06F 21/126; G06F 9/441; G06F 9/455; G06F 9/54; G06F 9/541; G06F 13/387
USPC ........................ 710/16, 15, 62, 100, 104, 106
See application file for complete search history.

(56) References Cited

U.S. PATENT DOCUMENTS

| | | | |
|---|---|---|---|
| 6,125,411 A * | 9/2000 | Sato ................................. | 710/38 |
| 6,804,727 B1 * | 10/2004 | Rademacher ..................... | 710/9 |
| 6,904,482 B2 * | 6/2005 | Rietze et al. ................... | 710/107 |
| 7,574,534 B2 * | 8/2009 | Bolan et al. ..................... | 710/15 |
| 7,788,425 B2 * | 8/2010 | Ikemoto .......................... | 710/36 |
| 7,870,302 B2 | 1/2011 | Huang et al. | |
| 8,356,118 B2 * | 1/2013 | Komoda .......................... | 710/13 |
| 8,452,904 B2 * | 5/2013 | Takebe et al. .................... | 710/62 |
| 8,473,666 B2 * | 6/2013 | Cohen et al. .................. | 710/313 |
| 8,661,164 B2 * | 2/2014 | Chen et al. ....................... | 710/8 |
| 2004/0203296 A1 * | 10/2004 | Moreton et al. ............. | 439/894 |
| 2010/0325329 A1 * | 12/2010 | Sakai ............................ | 710/269 |
| 2012/0054384 A1 * | 3/2012 | Zhang et al. .................... | 710/62 |

FOREIGN PATENT DOCUMENTS

| | | |
|---|---|---|
| CN | 101561785 A | 10/2009 |
| EP | 1221653 A2 | 7/2002 |

(Continued)

*Primary Examiner* — Farley Abad
*Assistant Examiner* — Getente A Yimer
(74) *Attorney, Agent, or Firm* — Cha & Reiter, LLC.

(57) ABSTRACT

An apparatus and method for determining an Operation System (OS) of a host device connected through USB in a portable terminal. The apparatus includes a connection port for receiving a descriptor request from the host device, an analysis unit for analyzing the received descriptor request and providing the analyzed result, an OS determining unit for determining the OS of the host device using information received from the analysis unit, and a controller that controls the analysis unit and the OS determining unit to analyze the descriptor request of the host device and determine the OS of the host device.

17 Claims, 6 Drawing Sheets

(56) References Cited

FOREIGN PATENT DOCUMENTS

| EP | 1832982 A1 | 9/2007 |
| EP | 2423825 A1 | 2/2012 |
| WO | 2004/046942 A1 | 6/2004 |

* cited by examiner

| | WINDOWS, LINUX BASED PC | MAC PC |
|---|---|---|
| DESCRIPTOR REQUEST METHOD | REQUEST STRING DATA BY PREDETERMINED SIZE | 1. REQUEST SIZE OF STRING DATA WHEN REQUESTING STRING DATA<br>2. REQUEST STRING DATA BY A SIZE PROVIDED FROM HOST DEVICE |

APPARATUS AND METHOD FOR VERIFYING OPERATING SYSTEM OF HOST DEVICE IN PORTABLE TERMINAL

CLAIM OF PRIORITY

This application claims the benefit of priority under 35 U.S.C. §119(a) from a Korean patent application filed in the Korean Intellectual Property Office on Feb. 24, 2012 and assigned Serial No. 10-2012-0018999, the entire disclosure of which is hereby incorporated by reference in its entirety.

BACKGROUND OF THE INVENTION

1. Field of the Invention

The present invention relates to a portable terminal connected with a host device. More particularly, the present invention relates to an apparatus and method for determining an Operating System (OS) of a host device connected through a Universal Serial Bus (USB) in a portable terminal.

2. Description of the Related Art

Recently, in accordance with the rapid development of portable terminals, as such devices can now perform wireless voice communication and information exchange via the Internet. As a result, portable terminals have become necessities of modern life. It is recognized that in the beginning of development of portable terminals, there primary appeal was that such portable terminals were simply carried and permitted performance of wireless communication. However, as the technology used in the design and manufacture of such portable terminals has been developed over time, and wireless Internet access has been introduced, modern portable terminals may perform not only a phone call function or a schedule management function but also game functions, a remote controller function using local area communication, and an image photographing function by a mounted digital camera. Therefore, because the useful ranges of functions of the portable terminals are gradually increasing, the portable terminals satisfy the needs of users more than ever.

In addition, the portable terminal may connect to a host device using Universal Serial Bus (USB) communication, and may transmit a previously stored data to the host device or may read a data stored in the host device.

The USB has an interface standard capable of connecting a variety of peripheral devices by a common connector and may connect a maximum of 127 devices. Due to the lack of a requirement to reboot the host device in order to change settings of the portable terminal which supports the USB, the portable terminal may be connected or disconnected when the host device is being used (hot pluggable).

Figure 1A:
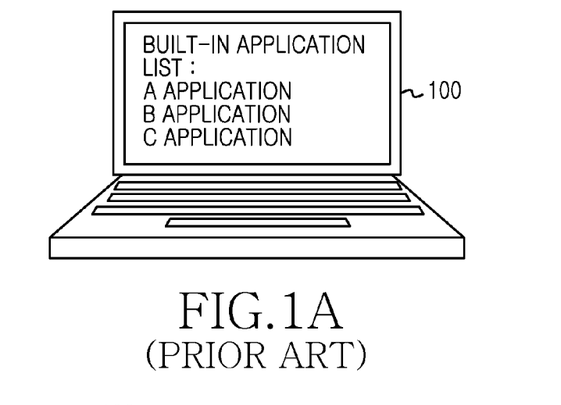
FIGS. 1A, 1B and 1C illustrate a process of connecting with a host device using a conventional portable terminal.
Figure 1B:
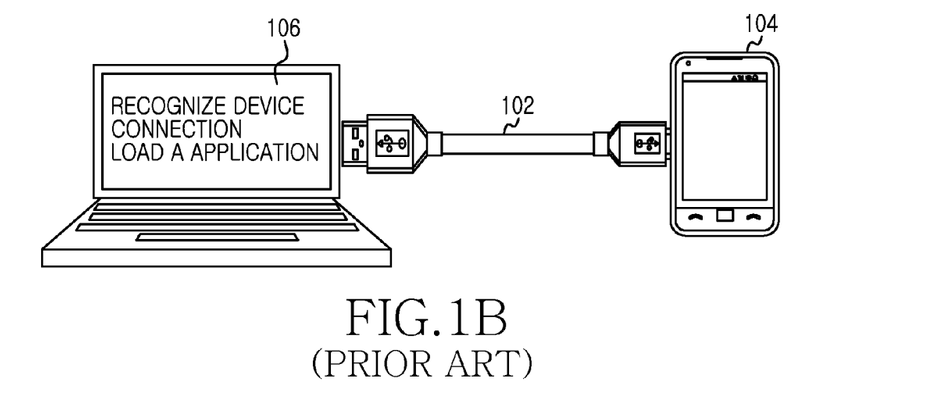
Figure 1C:
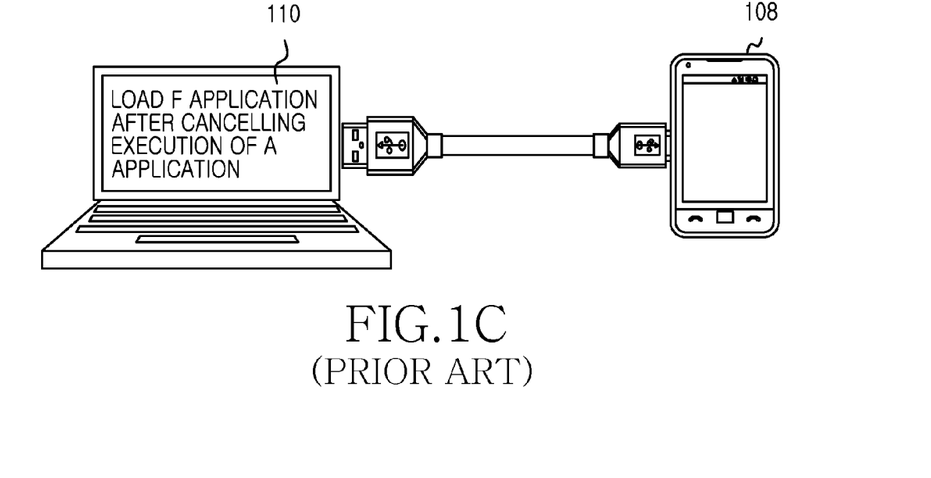

FIGS. 1A, 1B and 1C illustrate a process of connecting with a host device using a conventional portable terminal.

Referring now to FIGS. 1A to 1C, as shown in FIG. 1A, a plurality of built-in applications is installed in the host device denoted by 100. Each of the plurality of built-in applications is an application provided from the OS of the host device 100. When the host device is connected with a portable terminal through the USB, each of the built-in applications is executed prior to other applications.

As shown in FIG. 1B, when a portable terminal 104 and a host device 106 are connected through a cable 102, the host device 106 requests a descriptor from the portable terminal 104 and performs a USB enumeration process. The USB enumeration process is a process that verifies whether the portable terminal 104 is connected or disconnected to the host device.

When the OS of the host device 106 prioritizes and executes the built-in applications, if connection of the portable terminal 104 is recognized, the host device 106 executes a built-in application corresponding to a protocol supported by the portable terminal 104. As shown in FIG. 1B, the OS of the host device 106 executes an "A" application.

As shown in FIG. 1C, if a user does not execute the built-in applications, he or she ends the execution of the "A" application. Therefore, the OS of the host device 106 may execute not a built-in application but an "F" application (110) which is not only NOT a built-in application but may also control an operation of a portable terminal 108.

In other words, there is a problem in that the conventional portable terminal may be controlled through a built-in application according to the OS of the host device irrespective of a protocol set in a descriptor of the portable terminal.

Accordingly, there is a need in the art for an apparatus and method for preventing a portable terminal from being controlled through a built-in application of an OS of a host device.

SUMMARY OF THE INVENTION

An exemplary aspect of the present invention is to solve at least some of the above-mentioned problems and/or disadvantages and to provide at least the advantages described below. Accordingly, an exemplary aspect of the present invention is to provide an apparatus and method for verifying an OS of a host device in a portable terminal.

Another exemplary aspect of the present invention is to provide an apparatus and method for analyzing a descriptor request of a host device and determining an OS of the host device in a portable terminal.

Still another aspect of the present invention is to provide an apparatus and method for converting a descriptor according to an OS of a host device in a portable terminal.

Yet another aspect of the present invention is to provide an apparatus and method for preventing an application which is built in an OS of a host device from being executed in a portable terminal.

In accordance with an exemplary aspect of the present invention, an apparatus for verifying an OS of a host device in a portable terminal is provided. The apparatus may include a connection port that receives a descriptor request from the host device, an analysis unit that analyzes the received descriptor request and providing the analyzed result, an OS determining unit that determines the OS of the host device using information received from the analysis unit, and a controller that controls the analysis unit and the OS determining unit to analyze the descriptor request of the host device and determine the OS of the host device.

In accordance with another exemplary aspect of the present invention, a method of verifying an OS of a host device in a portable terminal is provided. The method may include receiving a descriptor request from the host device, analyzing the received descriptor request, and determining the OS of the host device using a descriptor request type.

In accordance with still another aspect of the present invention, an electronic device is provided. The electronic device comprises hardware including one or more processors (or microprocessors), a non-transitory memory, and one or more modules, each of the modules including machine executable code stored in the memory and being configured for execution by the one or more processors, wherein each of the modules receives a descriptor request from the host device, analyzes the received descriptor request, and determines the OS of the host device using a descriptor request type.

BRIEF DESCRIPTION OF THE DRAWINGS

The above and other exemplary aspects, features and advantages of certain exemplary embodiments of the present invention will become more apparent to a person of from the following detailed description taken in conjunction with the accompanying drawings, in which.

DETAILED DESCRIPTION

Exemplary embodiments of the present invention will be described herein below with reference to the accompanying drawings. In the following description, well-known functions or constructions may not be described in detail when their inclusion would obscure the appreciation of the subject matter of the present invention by a person of ordinary skill in the art.

Hereinafter, an apparatus and method for analyzing a descriptor request of a host device and determining an OS of the host device in a portable terminal according to an exemplary embodiment of the present invention will be described in more detail. The term "portable terminal" refers to a portable electronic device. The portable terminal may comprise any of a number of devices including but in no way limited to as a mobile phone, a media player, a tablet computer, a handheld computer, and a Personal Digital Assistant (PDA). Also, the portable terminal may comprise a certain portable electronic device including a device in which two or more functions are combined among these devices.

More particularly, the present invention provides an apparatus and method for determining an Operating System (OS) of a host device connected through a Universal Serial Bus (USB) in a portable terminal Herein, OS may indicate operation system software.

Figure 2:
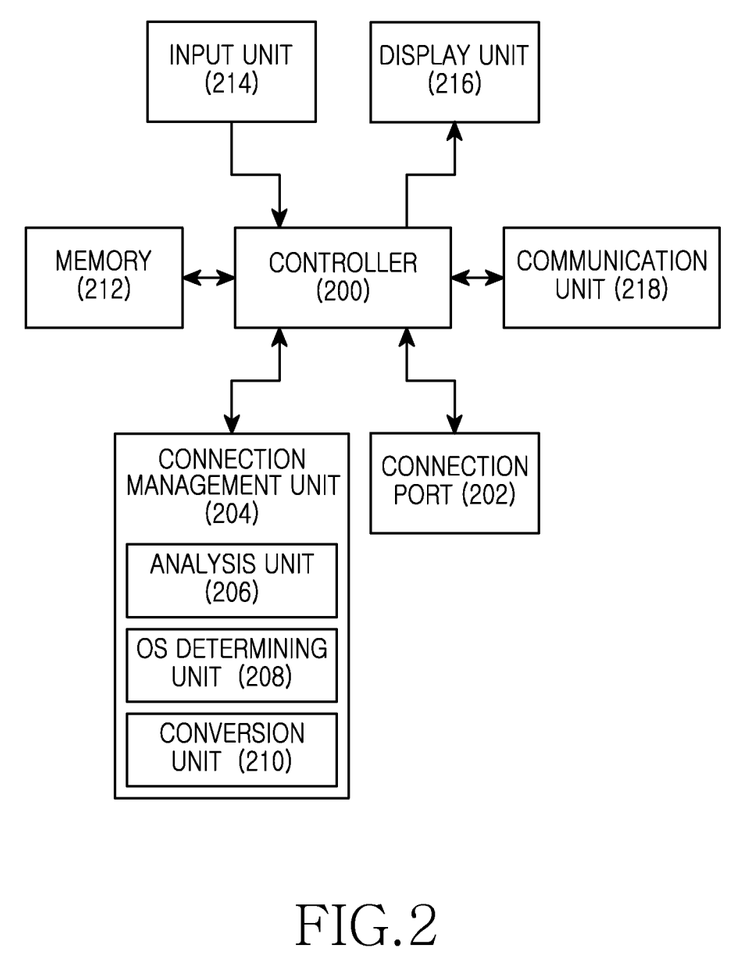
FIG. 2 is a block diagram illustrating configuration of a portable terminal for determining OS information of a host device according an embodiment to the present invention.

FIG. 2 is a block diagram illustrating exemplary configuration of a portable terminal configured for determining OS information of a host device according to the present invention.

Referring now to FIG. 2, the portable terminal may include, for example, a controller 200, a connection port 202, a connection management unit 204, a memory 212, an input unit 214, a display unit 216, and a communication unit 218.

The connection management unit 204 may include an analysis unit 206, an OS determining unit 208, and a conversion unit 210.

The controller 200 of the portable terminal, which comprises hardware such as a processor or microprocessor, is configured to control an overall operation of the portable terminal. For example, the controller 200 performs processing and control of voice communication and data communication. In addition to controlling general function, when receiving a descriptor connection request from a host device to be connected through USB, the controller 200 controls the connection management unit 204 to analyze the connection request and determine an OS of the host device.

In addition, when the controller 200 determines a host device which uses a particular OS for executing a built-in application, the controller 200 is configured to control the connection management unit 204 to convert a descriptor to prevent execution of an application which is built in the OS.

The connection port 202 preferably comprises a connection port for connecting with the host device. The connection port 202 may include a USB port, and may also include a Mobile High Definition Link (MHL) port. The connection port 202 receives a descriptor request from the host device.

With continued reference to FIG. 2, the connection management unit, 204, which includes hardware such as a processor or microprocessor configured for operation, determines the OS of the host device connected through the USB and converts a descriptor to prevent execution of the application which is built in the OS, under control of the controller 200.

The analysis unit 206 of the connection management unit 204 is configured to analyze the descriptor request of the host device and provides the analyzed information to the OS determining unit 208.

In other words, the analysis unit 206 may analyze a wLength field of a setup packet transmitted from the host device and may provide the analyzed information to the OS determining unit 208.

The OS determining unit 208 of the connection management unit 204 is configured to determine the OS of the host device using the information provided from the analysis unit 206. In other words, the OS determining unit 208 may use that the descriptor request of the host device to distinguish the particular OS of the host device.

For example, when the OS determining unit 208 verifies that the host device wants to acquire a descriptor thorough two requests to the portable terminal connected through the USB, the OS determining unit may determine that the descriptor request of the host device is a type of descriptor request of a host device which uses MACintosh (MAC) OS. In addition, when the OS determining unit 208 verifies that the host device wants to acquire a descriptor through one request to the portable terminal connected through the USB, the host device may determine that the descriptor request of the host device is a descriptor request of a host device which uses Windows or Linux OS.

Accordingly, the OS determining unit 208 may be configured to verify the wLength field of the setup packet and may ascertain the number of descriptor requests.

The conversion unit 210 of the connection management unit 204 converts a descriptor to prevent execution of an application which is built in the OS, so that the act of connecting a portable terminal to, for example, a tablet, does not inadvertently activate an application of the host device (in this case the tablet).

For example, the conversion unit 210 converts the descriptor to use attribute information defined by a manufacturer instead of protocol information described in the descriptor. Accordingly, when the portable terminal which supports the "Picture Transfer Protocol (PTP)" or the "Media Transfer Protocol (MTP)" connects with the host device through the USB, the conversion unit 210 prevents the host device from executing an application for supporting the "PTP" or the "MTP", which is built in the OS of the host device.

Operations of the controller 200 and the connection management unit 204 may be performed by a specific software module (command set) stored in the memory 212 that is loaded into hardware for operation.

Also, the connection management unit 204 may be defined as another controller. In addition, the controller 200 may be defined as a processor, and the connection management unit 204 may be defined as another processor.

The memory 212 includes a Read Only Memory (ROM), a Random Access Memory (RAM), and a flash ROM. The ROM stores a microcode which performs process and control of the controller 200 and the connection management unit 204, and a variety of reference data items. The memory 212 stores descriptors necessary for USB connection.

The RAM is a working memory of the controller 200 and stores a temporary data that is generated while various programs are performed. The flash ROM stores a variety of rewritable data, such as phonebook entries, outgoing messages, and incoming messages, most recent messages, etc.

The memory 212 can store machine executable code to perform operations of the controller 200 and the connection management unit 204 according to an exemplary embodiment of the present invention.

The input unit 214 may comprise a touchscreen, or a keypad with real or virtual numeric or alpha-numeric key buttons of '0' to '9' and a plurality of function keys, including but in no way limited to a menu button, a cancel button, an OK button, a talk button, an end button, an Internet access button, a navigation key (or directional key) button, and character input keys. The input unit 214, when embodied as a keypad, provides a key input data corresponding to a key pushed by a user to the controller 200. Any type of keypad configuration can be used.

The display unit 216 displays status information, characters, large volumes of moving and still pictures, etc., which are generated during operation of the portable terminal. In accordance with an exemplary embodiment of the present invention, the display unit 216 displays only a data item corresponding to a frame which is allowed from among data items included in a message. The display unit 216 may be a color Liquid Crystal Display (LCD), an Active Matrix Organic Light Emitting Diode (AMOLED), etc. Virtually any type of thin-film technology display can be used The display unit 216 may include a touch input device. Accordingly, the display unit 216 may be used as an input device when it is applied to a touch input type portable terminal. It is within the spirit and scope of the claimed invention that a single unit could constitute both the display unit and the input unit.

The communication unit 218 transmits and receives a Radio Frequency (RF) signal of a data that is input and output through an antenna (not shown). The communication unit may transmit according to a plurality of frequencies or protocols (Bluetooth, WIFI, WAP, 802.11, WLAN, 4G LTE, GSM, terrestrial, satellite, etc.). For example, in case of a transmitting process, a data that is to be transmitted, in the case of a spread spectrum protocol, can be subject to a channel-coding process and a spreading process, and then the data is converted into an RF signal. In case of a receiving process of the spread spectrum protocol, the RF signal is received and converted into a baseband signal, and the baseband signal is subject to a de-spreading process and a channel-decoding process, thereby restoring the data.

With further reference to FIG. 2, an artisan should understand and appreciate that according to the presently claimed invention, the functionality can be further separated, or integrated. For example, the function of the connection management unit 204 may be performed by the controller 200 of the portable terminal. However, the present invention includes the controller 200 and the connection management unit 204 which are exemplary configurations for the convenience of explanation and have not limited a scope of the present invention by such examples. It will be understood by those skilled in the art that various changes in form and details may be made therein without departing from the spirit and scope of the present invention. For example, the connection management unit 204 and the controller 200 may all performed in the controller 200.

Figure 3:
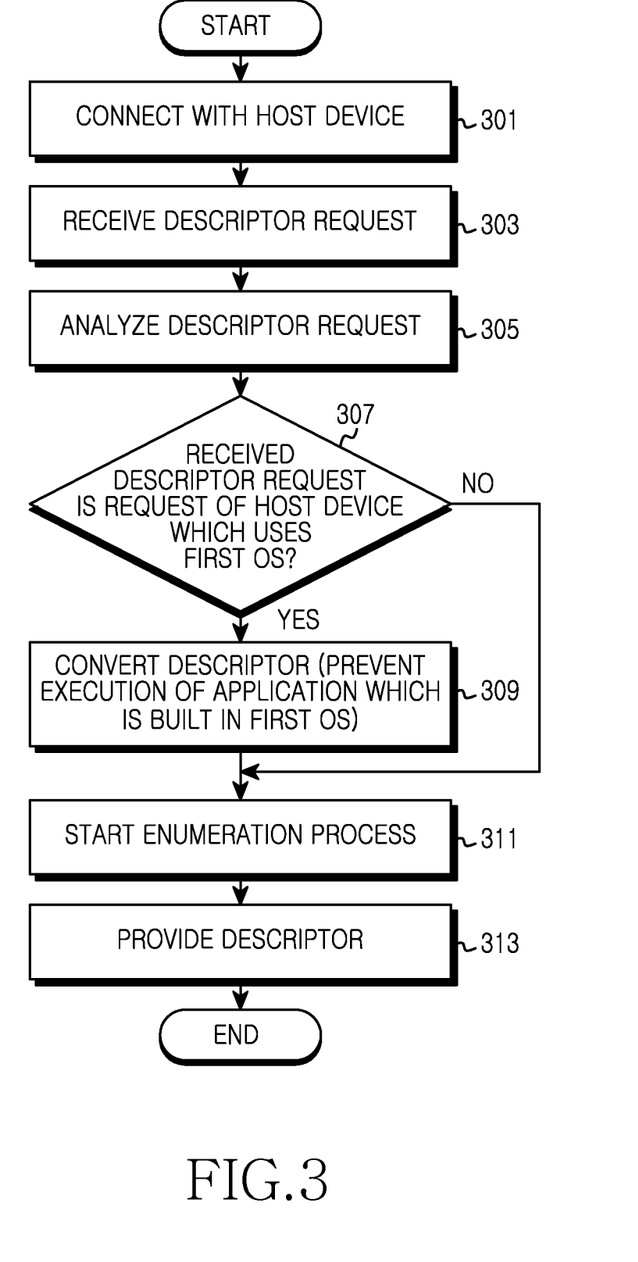
FIG. 3 is a flowchart illustrating exemplary operation of a process for verifying an OS of a host device in USB connection in a portable terminal according to an exemplary embodiment of the present invention.

FIG. 3 is a flowchart illustrating exemplary operation of a process of verifying an OS of a host device in USB connection in a portable terminal according to one exemplary embodiment of the present invention.

Referring now to FIG. 3, at step 301 the portable terminal performs a process of connecting with a host device through a port such as a USB. Herein, the host device may be a PC whose OS is installed. The portable terminal and the host device are connected with each other through a connection port.

At step 303 the portable terminal receives a descriptor request from the connected host device.

At step 305, the portable terminal performs a process of analyzing the descriptor request. Herein, the process of analyzing the descriptor request in step 305 is a process of verifying an OS of the host device connected in step 301. Herein, the portable terminal may use that the host device requests a descriptor by different types per OS of the host device.

At step 307, the portable terminal verifies that the connected host device is a host device which uses a first OS. Herein, the first OS refers to an OS for first executing a built-in application irrespective of a descriptor of the portable terminal connected through the USB and controlling the portable terminal. The built-in application refers to an application which is installed together when installing the OS.

If at step 307, it is verified that the connected host device is not the host device which uses the first OS but rather is a host device which uses a second OS, the portable terminal starts a USB enumeration process at step 311. Next at step 313, the portable terminal provides a descriptor to the host device. Herein, the second OS refers to an OS for controlling the portable terminal using an application corresponding to a descriptor of the portable terminal.

On the other hand, if it is verified/identified that the connected host is the host device which uses the first OS, the portable terminal converts a descriptor. More particularly, the portable terminal converts the form of a descriptor to prevent execution of an application which is built in the first OS. For example, the portable terminal converts the descriptor to use attribute information defined by a marker instead of protocol information described in the descriptor and can prevent the application which is built in the first OS from being executed.

With continued reference to FIG. 3, at step 311 the portable terminal starts the USB enumeration process. Then at step 313 the portable terminal provides the converted descriptor to the host device.

For this reason, the host device does not execute the application which is built in the first OS type according to the converted descriptor.

Therefore, the portable terminal ends the algorithm of FIG. 3.

Figure 4:
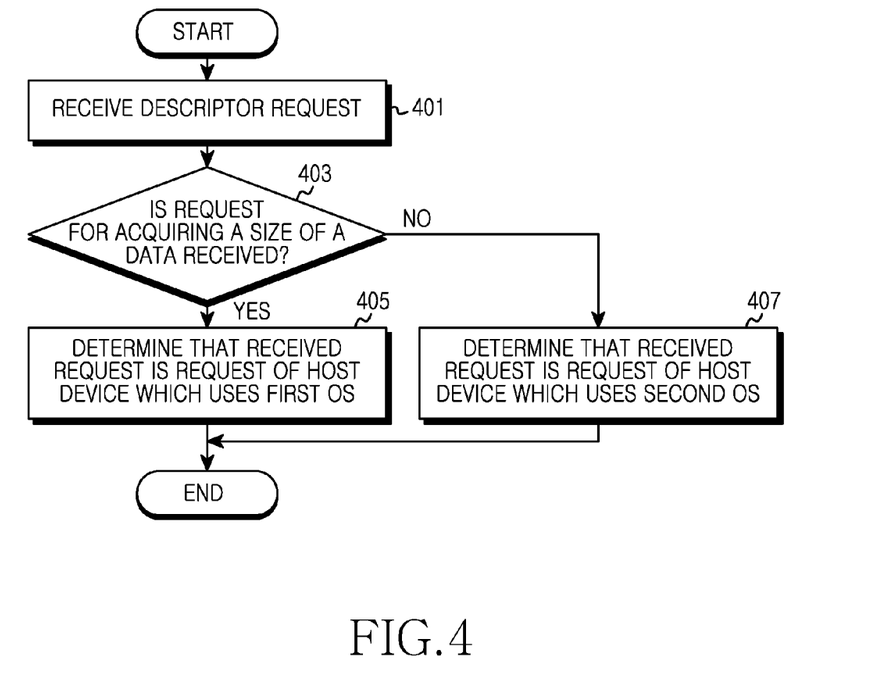
FIG. 4 is a flowchart illustrating exemplary operation of a process of determining an OS of a host device in a portable terminal according to an exemplary embodiment of the present invention.

FIG. 4 is a flowchart illustrating exemplary operation a process of determining an OS of a host device in a portable terminal according to one exemplary embodiment of the present invention.

Referring now to FIG. 4, at step 401 the portable terminal receives a descriptor request from the host device.

At step 403, the portable terminal verifies that a request for acquiring a size of a data is received by the descriptor request.

The host device performs a descriptor request by different types according to kinds of installed OSs.

For example, the OSs installed in the host device may be classified like Table 1 described later.

TABLE 1

| OS group | Type | A method of request for a descriptor |
|---|---|---|
| The first OS | MAC OS | Request a size of a descriptor data and request the descriptor by the received size |
| The second OS | Windows | Request the descriptor by the predetermined size |
| | Linux | |

Referring now to Table 1, a host device which uses a first OS (in the particular case MAC OS) may acquire a descriptor through two requests to the portable terminal connected through USB. A host device which uses a second OS (in this case Windows OS) may acquire a descriptor through one request to the portable terminal.

More particularly, the host device, which uses the first OS, requests a size of a descriptor data first when requesting the descriptor and receives the size of the descriptor data from the portable terminal. The host device, which uses the first OS, requests the descriptor by the size of the received data. On the other hand, the host device which uses the second OS requests the descriptor immediately by a predetermined size.

Accordingly, in accordance with an exemplary embodiment of the present invention, the portable terminal may analyze the descriptor request received from the host device and may determine the OS used in the host device.

In other words, at step 403 when the request for acquiring the size of the data is received, at step 405 the portable terminal may determine that the received request is a descriptor request of the host device which uses the first OS.

On the other hand, at step 403 when the request for acquiring a size of the data is not received, at step 407 the portable terminal may determine that the received request is a descriptor request of the host device which uses the second OS.

Therefore, the portable terminal which determines the OS of the host device ends the algorithm of FIG. 4.

Figure 5A:
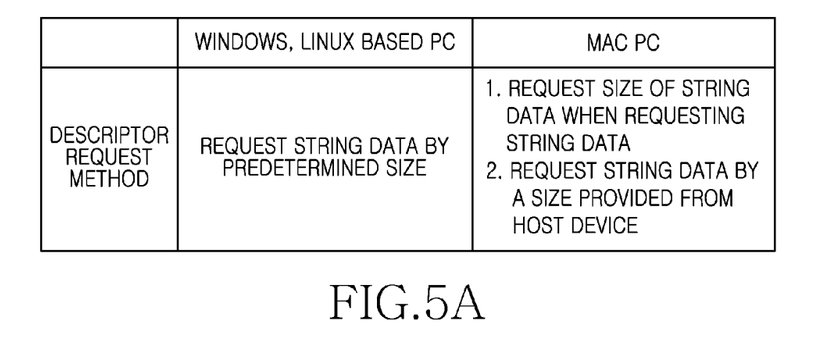
FIGS. 5A, 5B and 5C illustrate a descriptor request used to determine an OS of a host device in a portable terminal according to an exemplary embodiment of the present invention.
Figure 5B:
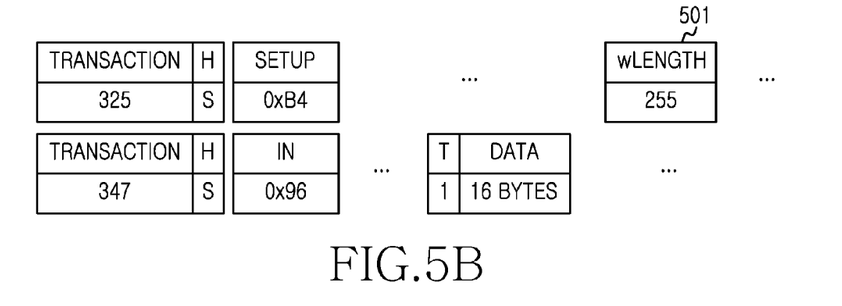
Figure 5C:
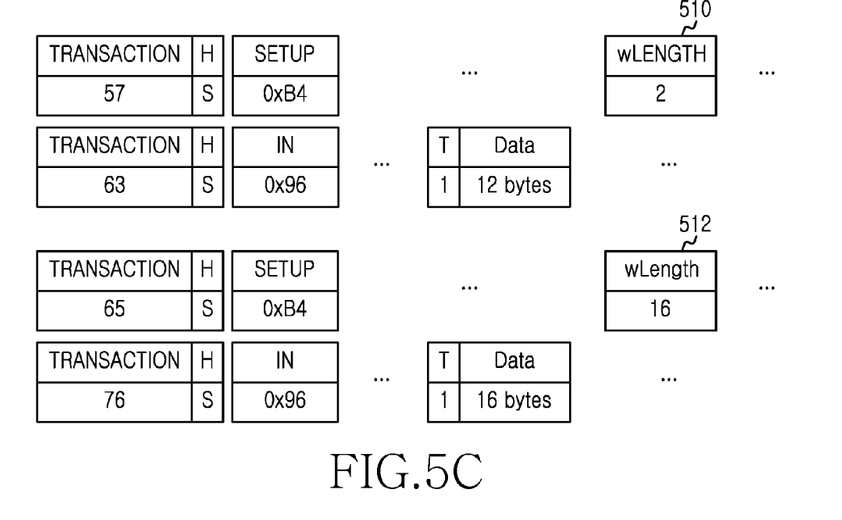

FIGS. 5A to 5C illustrate a descriptor request used to determine an OS of a host device in a portable terminal according to an exemplary embodiment of the present invention.

Referring now to FIGS. 5A to 5C, the portable terminal may classify a descriptor request method for an OS, as shown in FIG. 5A.

In addition, as shown in FIG. 5B, a host device which uses Windows or Linux OS can request a descriptor using a setup packet. Herein, as described in a wLength field (501) of the setup packet, the host device requests the descriptor by a size of 255 bytes.

The portable terminal transmits a response packet and transmits the descriptor to the host device.

However, as shown in FIG. 5C, a host device which uses MAC OS requests a descriptor using a setup packet. Herein, as described in a wLength field of the setup packet, the host device requests a size of the descriptor by a size of 2 bytes (510).

The portable terminal transmits a response packet and transmits a size of the descriptor to the host device.

As described in the wLength field of the setup packet, the host device requests the descriptor by the size of the data received from the portable terminal (512).

The portable terminal transmits a response packet and transmits the descriptor to the host device.

In conclusion, the host device (which uses Windows or Linux) OS acquires the descriptor through one descriptor request. The host device which uses MAC OS acquires the descriptor through two descriptor requests.

Figure 6A:
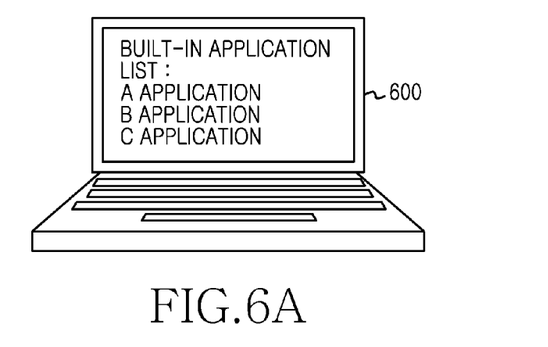
FIGS. 6A, 6B and 6C illustrate a process of connecting with a host device using a portable terminal according to an exemplary embodiment of the present invention.
Figure 6B:
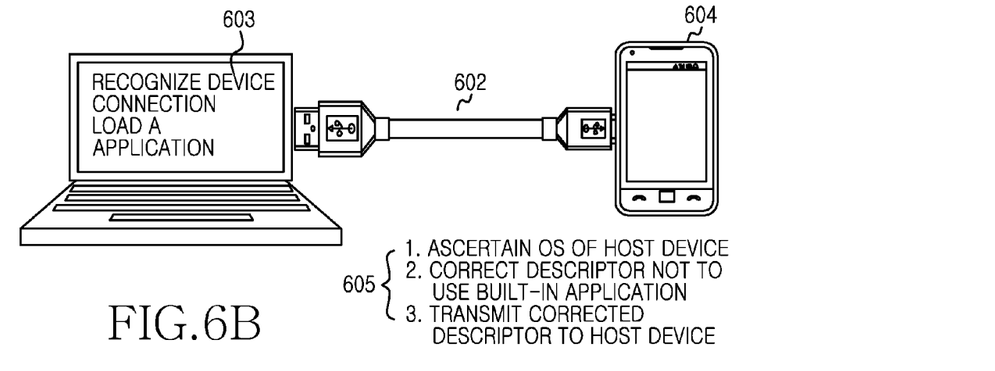
Figure 6C:
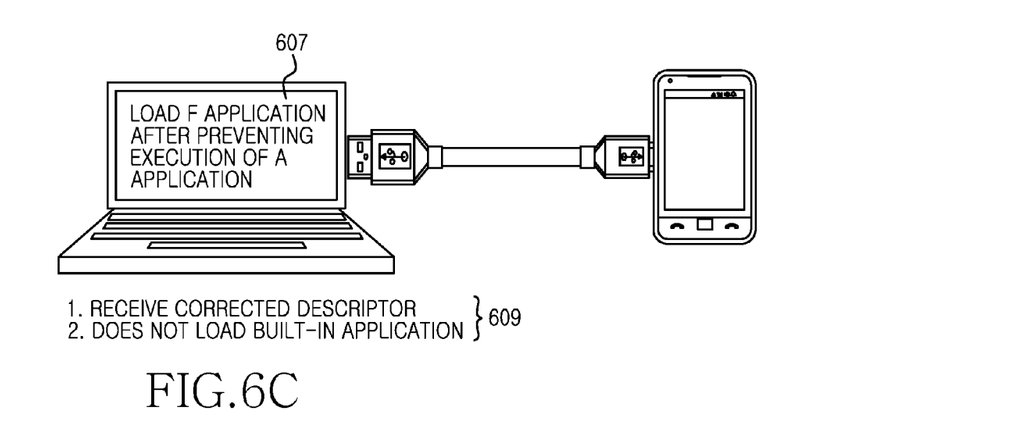

FIGS. 6A to 6C illustrate a process of connecting with a host device using a portable terminal according to one exemplary embodiment of the present invention.

Referring now to FIGS. 6A to 6C, as shown in FIG. 6A, a plurality of built-in applications are installed in the host device 600. Herein, each of the built-in applications is an application provided from an OS of the host device. When the host device is connected with the portable terminal through USB, each of the built-in application is executed prior to other applications.

As shown in FIG. 6B, when a portable terminal 604 and a host device 603 are connected through a cable 602, the host device 603 requests a descriptor from the portable terminal 604.

Herein, the host device 603 requests the descriptor by different types according to kinds of OSs.

Accordingly, the portable terminal 604 may convert the descriptor according to a particular OS of the host device 603 (605).

More particularly, the portable terminal may analyze a descriptor request of the host device 603 and may ascertain an OS of the host device 603. The portable terminal corrects/changes the descriptor so as not to use an application which is built in the host device 603 and transmits the corrected descriptor to the host device 603.

Herein, the portable terminal 604 may set a "vender specific" in a USB descriptor (e.g., Device_Descriptor, Configuration_Descriptor, and interface_Descriptor).

When a portable terminal which supports "Picture Transfer Protocol (PTP)" or "Media Transfer Protocol (MTP)" is connected with a host device through USB, the portable terminal prevents the host device from executing an application which supports the "PTP" or the "MTP", which is built into an OS of the host device.

Accordingly, as shown in FIG. 6C, a host device 607 which receives a corrected descriptor prevents execution of a built-in application, and instead executes an application set by a maker of a portable terminal, or perform an operation according to settings of the manufacturer (609). In other words, as shown in FIG. 6C, the host device 607 may prevent execution of an A application and may load an F application.

Methods according to claims of the present invention and/or embodiments described in the specification of the present invention may be implemented as hardware, or software loaded into hardware and executed constitute statutory subject matter in compliance with 35 U.S.C. §101.

The terms "unit" or "module" as used herein is to be understood under their broadest reasonable interpretation as comprising hardware such as integrated circuits constituting a processor or microprocessor configured for a certain desired functionality in accordance with statutory subject matter under 35 U.S.C. §101, a non-transitory memory including a flash memory, a ROM, an Electrically Erasable Programmable ROM (EEPROM), a magnetic disc storage device, a Compact Disc-ROM (CD-ROM), a Digital Versatile Disc (DVD) or an optical storage device of a different type, and a magnetic cassette. The terms "unit" or "module", nor any of the recited claim elements constitute software per se.

Also, a separate storage device on a communication network may connect to a portable electronic device.

For example, a module of an electronic device which includes one or more hardware items, including processors, a non-transitory memory, and one or more modules which are stored in the memory and are configured to be executed by the one or more processors may include commands for receiving a descriptor request from a host device, analyzing the received descriptor request, and determining an OS of the host device using a descriptor request type.

In addition, the module of the electronic device may include a command for verifying a descriptor request type for acquiring a size of a data. When the descriptor request for acquiring a data size is verified, the module may include a command for determining that the host device uses a first OS. When the descriptor request for acquiring the data size is not verified, the module may include a command for determining that the host device uses a second OS.

In addition, the module of the electronic device may include commands for verifying a wLength filed value of a setup packet transmitted by the host device and verifying a descriptor request type for acquiring the data size. The module may be an electronic module. In addition, the module of the electronic device may include commands for changing a descriptor according to a type of OS of the host device and performing an enumeration process using the changed descriptor.

In addition, the module of the electronic device may change at least one of Device_Descriptor, Configuration_Descriptor, and interface_Descriptor and may include a command for changing a descriptor according to an OS of the host device.

In addition, the module of the electronic device may include a command for changing a descriptor according to an OS of the host device to prevent an application in which a built-in OS of the host device is prevented from being executed.

As described above, the portable terminal according to one exemplary embodiment of the present invention verifies an OS of a host device. The portable terminal may convert a descriptor according to an OS of the host device and may prevent an application from being executed in the host device.

The above-described methods according to the present invention can be implemented in hardware, firmware or as software or computer code that is stored on a non-transitory machine readable medium such as a CD ROM, a RAM, a floppy disk, a hard disk, or a magneto-optical disk or computer code downloaded over a network originally stored on a remote recording medium or a non-transitory machine readable medium and stored on a local non-transitory recording medium, so that the methods described herein can be loaded into hardware such as a general purpose computer, or a special processor or in programmable or dedicated hardware, such as an ASIC or FPGA and executed hereby. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor" constitutes hardware in the claimed invention. Under the broadest reasonable interpretation, the appended claims constitute statutory subject matter in compliance with 35 U.S.C. §101.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. An electronic device comprising a controller configured to:
   receive, from a host device, a request for a communication interface descriptor;
   identify an operating system of the host device based on the request;
   generate the communication interface descriptor based on the operating system of the host device, wherein at least one field in the descriptor is modified to contain a value that is: (i) incompatible with a first application associated with the operating system and (ii) compatible with a second application that is executable in the operating system; and
   transmit the communication interface descriptor to the host device,
   wherein the operating system is configured to execute the first application before executing the second application when a connection between the host device and the electronic device is established and the field in the descriptor is set to a value that is compatible with the first application.

2. The electronic device of claim 1, wherein the communication interface descriptor is associated with a Universal Serial Bus (USB) interface.

3. The electronic device of claim 1, wherein the at least one field is set to indicate that the electronic device supports a data transfer protocol that is: (i) unsupported by the first application and (ii) supported by the second application.

4. The electronic device of claim 1, wherein the operating system is identified based at least in part on a wLength field value of the request.

5. The electronic device of claim 1, wherein the descriptor is transmitted as part of an enumeration process.

6. The electronic device of claim 1, wherein the descriptor includes at least one of a Device_Descriptor, Configuration_Descriptor, and Interface_Descriptor.

7. A method for use in an electronic device comprising:
   receiving, from a host device, a request for a communication interface descriptor;
   identifying an operating system of the host device based on the request;
   generating the communication interface descriptor based on the operating system of the host device, wherein the generating includes modifying at least one field in the descriptor to contain a value that is: (i) incompatible with a first application associated with the operating system and (ii) compatible with a second application that is executable in the operating system; and
   transmitting the communication interface descriptor from the electronic device to the host device,
   wherein the operating system is configured to execute the first application before executing the second application when a connection between the host device and the electronic device is established and the field in the descriptor is set to a value that is compatible with the first application.

8. The method of claim 7, wherein the communication interface descriptor is associated with a Universal Serial Bus (USB) interface.

9. The method of claim 8, wherein the at least one field is set to indicate that the electronic device supports a data transfer protocol that is: (i) unsupported by the first application and (ii) supported by the second application.

10. The method of claim 7, wherein the operating system is identified based at least in part on a wLength field value of the request.

11. The method of claim 7, wherein the descriptor is transmitted as part of an enumeration process.

12. The method of claim 7, wherein the descriptor includes at least one of a Device_Descriptor, Configuration_Descriptor, and Interface_Descriptor.

13. An electronic device comprising a processor and a non-transitory storage medium storing processor-executable instructions which when executed by the processor cause the processor to perform a process comprising:
   receiving, from a host device, a request for a communication interface descriptor;
   identifying an operating system of the host device based on the request;
   generating the communication interface descriptor based on the operating system of the host device, wherein the generating includes modifying at least one field in the descriptor to contain a value that is: (i) incompatible with a first application that is built in the operating system and (ii) compatible with a second application that is executable in the operating system; and
   transmitting the communication interface descriptor to the host device,
   wherein the operating system is configured to execute the first application before executing the second application when a connection between the host device and the electronic device is established and the field in the descriptor is set to a value that is compatible with the first application.

14. The electronic device of claim 13, wherein the communication interface descriptor is associated with a Universal Serial Bus (USB) interface.

15. The electronic device of claim 13, wherein the at least one field is set to indicate that the electronic device supports a data transfer protocol that is: (i) unsupported by the first application and (ii) supported by the second application.

16. The electronic device of claim 13, wherein the operating system is identified based at least in part on a wLength field value of the request.

17. The electronic device of claim 13, wherein the descriptor includes at least one of a Device_Descriptor, Configuration_Descriptor, and Interface_Descriptor.

* * * * *